United States Patent [19]

Irvine et al.

[11] Patent Number: 5,009,455
[45] Date of Patent: Apr. 23, 1991

[54] SEAL

[76] Inventors: Bruce W. Irvine, 856 Andover Crescent, West Vancouver, British Columbia, Canada, V7S 1Y5; Bruce G. R. Irvine, 2908 Dickerson Place, Victoria, British Columbia, Canada, V9B 2G7

[21] Appl. No.: 446,507
[22] Filed: Dec. 5, 1989
[51] Int. Cl.$^5$ .............................................. F16L 17/00
[52] U.S. Cl. .................... 285/106; 285/275; 285/302; 285/349; 285/351
[58] Field of Search ................ 285/349, 96, 106, 108; 277/165, 275, 302, 351

[56] References Cited
U.S. PATENT DOCUMENTS

| | | | |
|---|---|---|---|
| 3,525,530 | 6/1968 | Bauer et al. | 277/165 |
| 4,497,494 | 2/1985 | Allen et al. | 277/165 X |
| 4,615,261 | 10/1986 | Meijer | 277/215 X |
| 4,688,830 | 8/1987 | Meisinger et al. | 285/106 X |

Primary Examiner—Randolph A. Reese
Assistant Examiner—Heather Chun
Attorney, Agent, or Firm—Townsend and Townsend

[57] ABSTRACT

A sealed joint between two relatively movable surfaces. There is a recess in a first surface and a sealing member is received in with a close fit in the recess. The sealing member has a modulus of elasticity such that it does not deform substantially under a predetermined external pressure. The sealing member extends from the recess to contact the second surface. A sealing ring is received in the recess to provide an additional seal for the joint. Pressure applied to one side of the joint can act on that side of the sealing member remote from the second surface to force the sealing member against the second surface. The end of a sealing member is chamfered where it contacts the second surface to reduce the area of contact with the second surface.

9 Claims, 1 Drawing Sheet

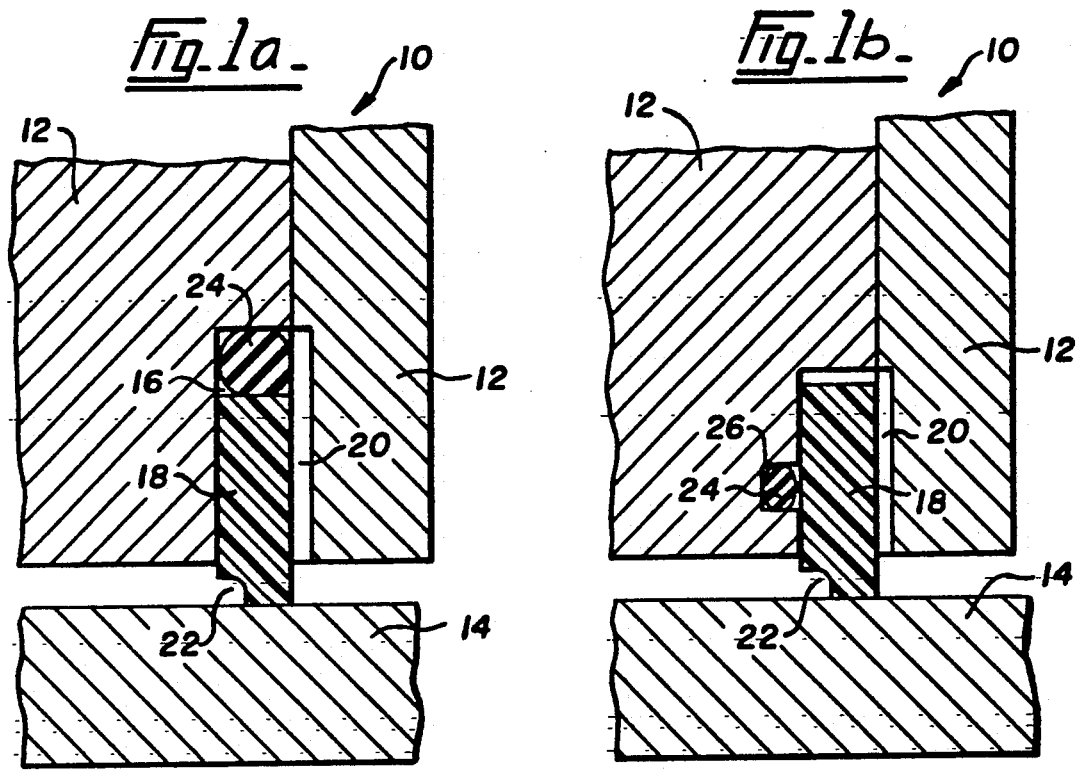
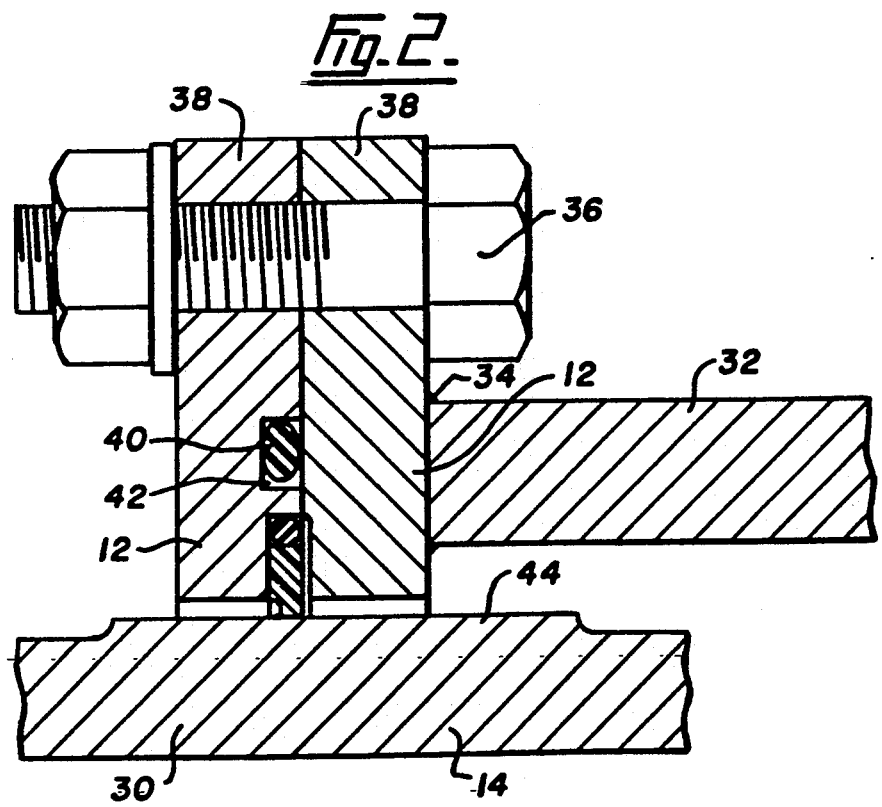

SEAL

FIELD OF THE INVENTION

This invention relates to a sealed joint between two relatively movable surfaces.

The joint is of particular value where it is required to resist substantial pressure difference in, for example, a diving suit or submarine periscope. However the seal can also be used where there is a small pressure differential to provide just sufficient pressure to seal at each depth thereby requiring the least possible resistance to motion at any depth within a design range.

If a deep sea diver is to be able move then, obviously, his diving suit must have joints. Equally obviously the joints must be sealed and the sealing of these joints has presented a considerable problem. The earlier attempts to solve the problem generally involve applying high force to a seal but that reduces the moibility of the seal and thus the joint.

DESCRIPTION OF THE PRIOR ART

Prior art known to applicant includes U.S. Pat. Nos.
4,549,753 to Nuytten;
4,077,218 to Humphrey;
1,349,060 to Gall;
3,242,499 to Fonda-Bonardi;
3,754,779 to Peress;
3,329,967 to Martinez and
4,369,814 to Humphrey Of the above Nuytten shows a rotary joint for diving suits having pressure compensating ability. The seals of the rotary joint are annular rings acted upon by bearing surfaces of a central member. The central member is biased against the seals by a spring. The central member is also housed within an oil filled chamber. A pressure channel is provided which experiences outside water pressure. The central member operates within an oil filter chamber to contain oil whose pressure resist the axial load on the joint caused by external pressure.

Humphrey discloses an articulated joint designed to allow pressurized fluid lost from the joint to be continually replaced. The joint comprises an annular piston slidably located in an annular cylinder of an adjacent member. The annular space between the piston and the cylinder is filled with a substantially incompressible fluid. Sealing O-rings are used to seal the chamber. The seals in this arrangement are not directly exposed to external pressure.

Gall discloses a ball joint having a sealing member in the form of a ring formed of rubber or other suitable material.

The remaining of the above prior patents may be considered of general interest. In general they involve an annular piston engaging in an annular cylinder to provide a flexible and rotatable joint. The patents use conventional sealing means between the annular cylinder and the annular piston.

All of the above patents either are of considerable complexity or exert undue loads on the seal which means that at some depth the seal will fail. The seal in Gall, U.S. Pat. No. 1,349,060 has the disadvantage that as external pressure increases on the flexible membrane, perpendicular to the sealing surface, the pressure causes the membrane to deform and, in so doing, increases the contact sealing area. This increase in contact sealing area reduces the pressure that would exist if the area did not increase so that at some depth the contact pressure of the sealing surface will not be able to equal the external pressure. Leaking will result. Furthermore, a very large force will be applied to the sealing surface to maintain the joint leakproof and this makes the joint unworkable in a diving suit at great depth. The structure in Gall always applies the driving force to the membrane on a surface that is perpendicular to the sealing surface. The driving force may be from a threaded member or from external fluid pressure.

SUMMARY OF THE INVENTION

The present invention seeks to provide a joint that is simple in structure and is based on a principle, Irvine's Principle put forward by the inventors. This principle states that to prevent the passage of fluid across a seal that is under a difference in pressure the contact pressure of the seal must be greater than the larger of the fluid pressures on either side of the seal.

The application of this principle permits the construction of a sealed joint of great simplicity.

Accordingly, the present invention provides a sealed joint between two relatively movable surfaces comprising:

a recess in a first surface;
a sealing member received in the recess with a clearance, the sealing member having a modulus of elasticity such that it does not deform substantially under a predetermined external pressure;
the sealing member extending to contact the second surface;
a sealing ring received in the recess to provide an additional seal for the joint;

whereby pressure applied to one side of the joint can act on that side of the sealing member remote from the second surface to force the sealing member against the second surface, the end of a sealing member being chamfered where it contacts the second surface to reduce the area of contact.

In a preferred embodiment the sealing member is self-lubricating and has a low co-efficient of friction. The polymer polytetrafluoroethylene (PTFE) is ideal in this regard. The sealing member should desirably have a Young's Modulus of elasticity of about 60,000 p.s.i. in a stress range of 1200 p.s.i. compressive stress and a temperature in the range of 0° to 20° C. Such a sealing member will not deform under substantial external pressure, which is an important feature of the present invention.

The sealing ring may be an O-ring.

BRIEF DESCRIPTION OF THE DRAWINGS

The invention is illustrated in the drawings, in which:
FIG. 1a is a section through a sealed joint according to the present invention;
FIG. 1b illustrates a variation of the sealed joint of FIG. 1a; and
FIG. 2 illustrates an apparatus used to test the effectiveness of the joint of FIG. 1a.

DESCRIPTION OF THE PREFERRED EMBODIMENTS

FIG. 1a shows a sealed joint 10 comprising a first surface 12 and a second surface 14. There is a recess 16 in the first surface 12 and a sealing member 18 is received in the recess 16 with a close fit. However a plurality of channels 20 ensure that the top or inner end of sealing member 18 is subject to external pressure. The sealing member 18 has a modulus of elasticity such that it does not substantially deform under a predetermined external pressure.

The sealing member 18 extends to contact the second surface 14. There is a chamfering of the sealing member 18 at 22 where it contacts the second surface 14. This chamfering reduces the area of contact. The difference in areas, created by the chamfer, seen by the internal and external pressures causes a driving force which generates the pressure on the sealing surface by the sealing member.

The choice of material for the sealing member must be such that it allows a sufficient portion of the driving force to generate an intensity of pressure at the sealing surface sufficient to create a seal as required by Irvine's Principle as set out above.

There is a sealing ring in the form of O-ring 24 received in recess 16 which assists in providing a seal for the joint. In this regard FIG. 1b differs from FIG. 1a in the provision of a channel 26 to receive the O-ring.

The drawings are on a greatly enlarged scale. An example of the invention has a sealing member 18 about 0.3" in height and width of about 0.13". The O-ring 24 is of a diameter of about 0.1" and, in the preferred embodiment, may be formed of a fluorosilicone, butyl rubber or nitrile rubber, with a Shore A 53 hardness in the range of about 0°–20° C. The sealing member 18 is of PTFE having Young's Modulus of elasticity of 60,000 p.s.i. in a stress range of 1200 p.s.i. and a temperature range of 0° to 20° C. The channels 20 in the recess 16 are about 0.03" in depth with a radius of about 0.03" and the clearance between the two surfaces 12 and 14 is about 0.3". The surface 14 contacted by the sealing member 18 is machined as accurately as possible and polished as accurately as possible so that the surface is smooth and as precisely formed as possible to reduce friction.

The above is a mere example of an effective embodiment. For example, the squeeze exerted by the O-ring 24 in FIG. 1a must be determined by trial. In the embodiment of FIG. 1a the O-ring should be determined by trial because to achieve initial contact at the sealing surface the O-ring should compress the PTFE member 18 just sufficient to overcome manufacturing tolerances and surface irregularities in both the sealing member 18 and the surface 14. Alternatively, and in particular with regard to FIG. 1b the sealing member 18 may be pretensioned by forming its inner periphery slightly smaller than the outer periphery of surface 14. In this way the sealing member must be stretched slightly to fit over the surface 14, thus providing the requisite pretension.

Ring 24 creates a seal for sealing member 18.

As external pressure is applied to the joint the O-ring transmits a portion of the pressure to the top of the sealing member 18. The chamfering of the base of the member 18, typically carried out to a depth of about 0.1", allows internal pressure to be present under a portion of the sealing member 18. This provides a hydraulic loading on the portion of the sealing member 18 that contacts the surface 14 and this loading will increase with increasing depth.

The invention was tested in an apparatus shown in part in FIG. 2. The apparatus of FIG. 2 comprises concentric tubes 30 and 32 the outer of which is welded at 34 to first surface 12. A plurality of bolts 36 are used to locate flanges 38 that make up surface 14 together and an additional O-ring is provided in a recess 42. There are two such seals one at each end that close off the space between the tubes 30 and 32. Pressure can be applied to that space through an opening, not shown. The outer is designed to move on a raised area 44 of the inner tube 30 which is polished as highly as possible.

Using this test equipment pressure was applied to the space between the tubes 30 and 32 and the sliding resistance of the outer assembly on the inner tube was measured with a spring balance as the pressure was increased.

The results are shown in Table 1 in which the pressure is given in feet of sea water.

| | FIRST TEST | |
|---|---|---|
| DEPTH (FEET OF SEA WATER) | SLIDING RESISTANCE OF ASSEMBLY | COMMENTS |
| 25 | 6 lbs. | no leaks |
| 50 | 7 lbs. | no leaks |
| 75 | 8 | no leaks |
| 100 | * | no leaks |
| 125 | * | no leaks |
| 150 | * | no leaks |
| 175 | * | no leaks |
| 200 | * | no leaks |
| 250 ft. - end of gauge | * | no leaks |

*It was difficult to assess the friction accurately after the third run, to a depth of 75 ft. of sea water. The spring balance used was not sufficiently accurate and the surface at 44 was relatively poor with an irregular finish. Furthermore, the sealing member 18 was not machined to the highest possible accuracy. Therefore smooth movement and thus accurate reading of the sliding resistance of the assembly was not possible. Nevertheless, even with the relatively unsatisfactory equipment, it should be noted that no leaking was observed down to a simulated depth of 250 ft. of sea water and sliding movement was possible at all calculated depths.

highest possible accuracy. Therefore smooth movement and thus accurate reading of the sliding resistance of the assembly was not possible. Nevertheless, even with the relatively unsatisfactory equipment, it should be noted that no leaking was observed down to a simulated depth of 250 ft. of sea water and sliding movement was possible at all a calculated depths.

The present invention has a great simplicity of structure. High quality machining is desirable, particularly where great depth are to be encountered, but the appropriate levels of machining are easily available on modern equipment.

The seal finds application in diving suits for use at great depths and, particularly, so-called atmospheric diving suit where the diver is at relatively low pressure within the suit, despite the high external pressure. The apparatus can also be used on periscopes and it is envisaged that the same seal could be used in space suits because of the high efficiency and relative cheapness.

Indeed, the apparatus finds application wherever a low friction seal is required on a sliding or rotating surface.

The sealing member has been described as being made of a polytetrafluoroethylene. However fluorinated polymers available under the track mark Teflon are generally useful in this regard. They have the requisite Young's Modulus of elasticity. These compounds include, in addition to polytetrafluoroethylene copolymers of tetrafluoroethylene and hexafluoroproypylene.

we claim:

1. A sealed joint between two relatively movable surfaces comprising:
   a recess in a first surface;
   a sealing member received in the recess with a clearance, the sealing member having a modulus of elasticity such that it does not substantially deform under a predetermined external pressure;

the sealing member extending to contact the second surface;

a sealing ring received in the recess to provide an additional seal for the joint;

whereby pressure applied to one side of the joint can act on that side of the sealing member remote from the second surface to force the sealing member against the second surface, the end of the sealing member being of reduced area where it contacts the second surface to reduce the area of contact with the second surface.

2. A joint as claimed in claim 1 in which the sealing member is self-lubricating.

3. A joint as claimed in claim 1 in which the sealing member is of a low co-efficient of friction.

4. A joint as claimed in claim 1 in which the sealing member is made of polytetrafluoroethylene (PTFE).

5. A joint as claimed in claim 1 in which the sealing member has a Young's Modulus of elasticity of about 60,000 p.s.i. in a stress range of 1200 p.s.i. and a temperature in the range of 0° to 20° C.

6. A joint as claimed in claim 1 in which the sealing ring is an O-ring.

7. A joint as claimed in claim 6 in which the O-ring is located in the recess, in contatc with the sealing member, remote from the second surface.

8. A joint as claimed in claim 7 in which the O-ring is located in the recess in a channel, to contact the sealing member.

9. A joint as claimed in claim 7 in which the O-ring is of a fluorosilicone, butyl rubber or nitrile.

* * * * *